United States Patent [19]
Yu et al.

[11] Patent Number: 6,070,248
[45] Date of Patent: May 30, 2000

[54] GENERATION OF A STABLE REFERENCE CLOCK FREQUENCY FROM A BASE CLOCK FREQUENCY THAT MAY VARY DEPENDING ON SOURCE

[75] Inventors: Ching Yu, Santa Clara; Jeffrey R. Dwork, San Jose, both of Calif.

[73] Assignee: Advanced Micro Devices, Inc., Sunnyvale, Calif.

[21] Appl. No.: 08/989,986

[22] Filed: Dec. 12, 1997

[51] Int. Cl.⁷ .................................................. G06F 1/08
[52] U.S. Cl. ............................................. 713/501; 327/291
[58] Field of Search .................... 713/500, 501; 327/270, 291; 377/47, 48, 52

[56] References Cited

U.S. PATENT DOCUMENTS

| | | | |
|---|---|---|---|
| 5,095,280 | 3/1992 | Wunner et al. | 328/63 |
| 5,771,373 | 6/1998 | Kau et al. | 395/555 |
| 5,790,609 | 8/1998 | Swoboda | 375/357 |
| 5,794,021 | 8/1998 | Hewitt | 395/556 |
| 5,903,746 | 5/1999 | Swoboda et al. | 395/556 |

FOREIGN PATENT DOCUMENTS

| | | |
|---|---|---|
| 0721157 | 7/1996 | European Pat. Off. . |
| 2246455 | 1/1992 | United Kingdom . |

*Primary Examiner*—Joseph E. Palys
*Assistant Examiner*—Omar Omar
*Attorney, Agent, or Firm*—Monica H. Choi

[57] ABSTRACT

A clock signal generator within an electronic device locally generates a reference clock signal having a reference frequency from a base clock signal having a base frequency. The base clock signal is from a base signal source that is external to the electronic device, and the base frequency of the base clock signal may vary depending on the base signal source. The present invention includes a plurality of frequency dividers which are coupled to the base signal source. Each of the frequency dividers outputs a divided clock signal having a respective frequency that is the base frequency divided by a respective factor. A multiplexer accepts the value of the base frequency of the base clock signal as stored within a storage device that is external to the electronic device. The multiplexer then selects as the reference clock signal a divided clock signal having a respective frequency that is closest to the reference frequency depending on the value of the base frequency. In this manner, a reference clock signal having a stable reference frequency is generated for the electronic device despite possible variations in the base frequency of the base clock signal. The present invention may be used to particular advantage when the electronic device is an Ethernet computer network peripheral device coupled between a computer host system and a computer network, and when the base signal source is from the computer host system.

25 Claims, 2 Drawing Sheets

GENERATION OF A STABLE REFERENCE CLOCK FREQUENCY FROM A BASE CLOCK FREQUENCY THAT MAY VARY DEPENDING ON SOURCE

TECHNICAL FIELD

This invention relates to clock signal generators, and more particularly, to generating a reference clock signal having a stable reference clock frequency for an electronic device from a base clock signal having a base clock frequency that may vary depending on the base clock signal source which is external to the electronic device.

BACKGROUND OF THE INVENTION

The present invention will be described with an example application for an Ethernet computer network peripheral device which couples a host computer system to a network of computers. In this example application, the Ethernet computer network peripheral device locally generates a reference clock frequency from a base clock frequency provided by the host computer system or the network of computers. However, from this example application, it should be appreciated by one of ordinary skill in the art of electronic systems design that the present invention may be used for locally generating a reference clock frequency at any electronic device from a base clock frequency provided by any base clock signal source that is external to the electronic device.

Referring to FIG. 1, a network of computers 100 includes a first computer 102, a second computer 104, a third computer 106, and a fourth computer 108 interconnected to each other via a linking network 110. A computer peripheral device 112 is within the first computer 102 to provide added functionality to the first computer 102. For example, this computer peripheral device 112 may be an Ethernet computer network peripheral device which allows the first computer 102 to communicate with the other computers 104, 106, and 108 via the linking network 110.

Such a computer peripheral device 112 includes timers for timing events of data transmission and reception and other types of events at the first computer 102 or at other parts of the network of computers 100. These timers require a respective reference clock signal having a respective reference frequency for timing such events. For example, an Ethernet computer network peripheral device may require a 1 MHZ (megahertz) reference clock signal for a 1 $\mu$s (microsecond) timer and a 10 MHZ reference clock for a 0.1 $\mu$s timer.

Although the computer peripheral device 112 needs reference clock signals for timing events, original clock signal generators may be costly to incorporate within the computer peripheral device 112. The host system of the first computer 102 typically has a base clock signal having a base frequency. Moreover, other parts of the network of computers 100 including the second computer 104, the third computer 106, the fourth computer 108, and the linking network 110 may include a respective base clock signal having a base frequency. Thus, it would be desirable to generate the reference clock signals for use within the computer peripheral device 112 from a base clock signal already available from a base clock signal source that is external to the computer peripheral device 112.

SUMMARY OF THE INVENTION

Accordingly, a primary object of the present invention is to generate a reference clock signal having a reference frequency for an electronic device from a base clock signal having a base frequency from a base clock signal source that is external to the electronic device. Because the base clock signal source is external to the electronic device, the base frequency of the base clock signal may vary depending on the base clock signal source. Thus, another object of the present invention is to generate a reference clock signal having a stable reference frequency even when the base frequency of the base clock signal may vary.

In a general aspect of the present invention, a clock signal generator generates a reference clock signal having a reference frequency for an electronic device from a base clock signal having a base frequency. The clock signal generator includes a first input coupled to a base signal source that is external to the electronic device for accepting the base clock signal from the base signal source. The clock signal generator also includes a second input coupled to a storage device that is external to the electronic device for accepting the value of the base frequency from the storage device. Furthermore, the clock signal generator includes a plurality of frequency dividers. Each frequency divider is coupled to the first input for dividing the base frequency of the base clock signal by a respective factor to generate a respective divided clock signal having a respective frequency. A multiplexer, coupled to the second input and to the plurality of frequency dividers, selects as the reference clock signal a divided clock signal having a respective frequency that is closest to the reference frequency from the plurality of divided clock signals.

The present invention may be used to particular advantage for generating reference clock signals for timing events within an Ethernet computer network peripheral device coupled between a computer host system and a computer network. In that case, the base signal source may be from the computer host system or the computer network, and the storage device containing the value of the base frequency may be an EEPROM within the computer host system or the computer network.

In other aspects of the present invention, a storage device clock signal is also generated from the base clock signal for reading the value of the base frequency from the storage device.

These and other features and advantages of the present invention will be better understood by considering the following detailed description of the invention which is presented with the attached drawings.

BRIEF DESCRIPTION OF THE DRAWINGS

FIG. 2, including

The figures referred to herein are drawn for clarity of illustration and are not necessarily drawn to scale. Elements having the same reference numeral in FIGS. 1–4 refer to the same element.

DETAILED DESCRIPTION

Figure 1:
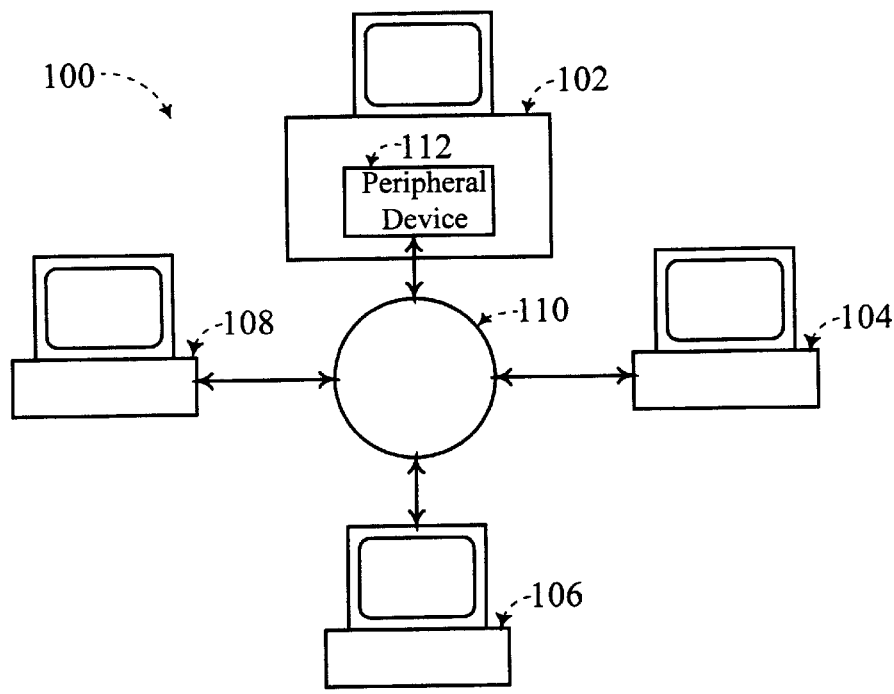
FIG. 1 shows a network of computers having a computer which includes a computer peripheral device that uses reference clock signals for timing events.

Referring to FIG. 1, the computer peripheral device 112 of the first computer 102 in the network of computers 100 requires a reference clock signal having a reference frequency for timing events. For example, the computer peripheral device 112 may be an Ethernet computer network peripheral device which requires a reference clock signal for timing transmission and reception of data packets between the first computer 102 and the rest of the network of computers 100.

Figure 2A:
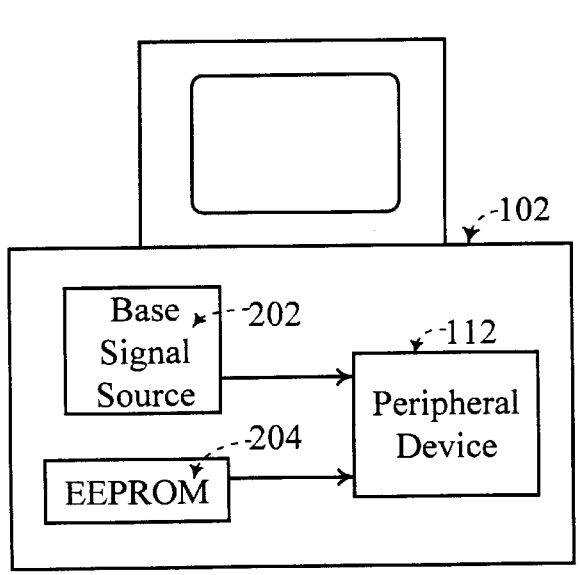
FIG. 2A and FIG. 2B, shows the computer peripheral device of FIG. 1 coupled to a base signal source and a storage device which are external to the computer peripheral device, according to preferred embodiments of the present invention.

Instead of including an original clock signal source, which may be costly, within the computer peripheral device 112, a base signal source which is external to the computer peripheral device 112 provides a base clock signal having a base frequency to the computer peripheral device 112. Referring to FIG. 2A, this base signal source 202 may be part of the host system of the first computer 102 having the computer peripheral device. A storage device 204 such as an EEPROM (Electronically Erasable Programmable Read Only Memory) which is also part of the host system of the first computer 102 stores information regarding the base clock signal such as the base frequency of the base clock signal. The base signal source 202 and the storage device 204 are coupled to the computer peripheral device 112 via any type of bus interface between a computer host system and a computer peripheral device as is known to one of ordinary skill in the art.

Figure 2B:
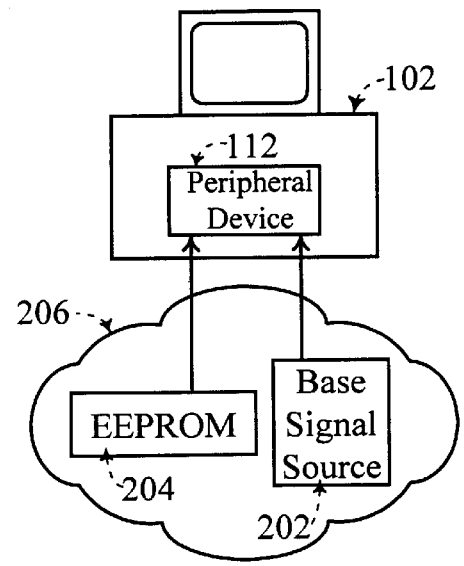

Referring to FIG. 2B, in an alternative embodiment of the present invention, the base signal source 202 and the storage device 204 may alternatively be part of the rest of the computer network 206 including the second computer 104, the third computer 106, the fourth computer 108, or the linking network 110 of FIG. 1. In this embodiment also, the base signal source 202 and the storage device 204 are coupled to the computer peripheral device 112 via any type of bus interface between a computer peripheral device and a network of computers as is known to one of ordinary skill in the art.

Figure 3:
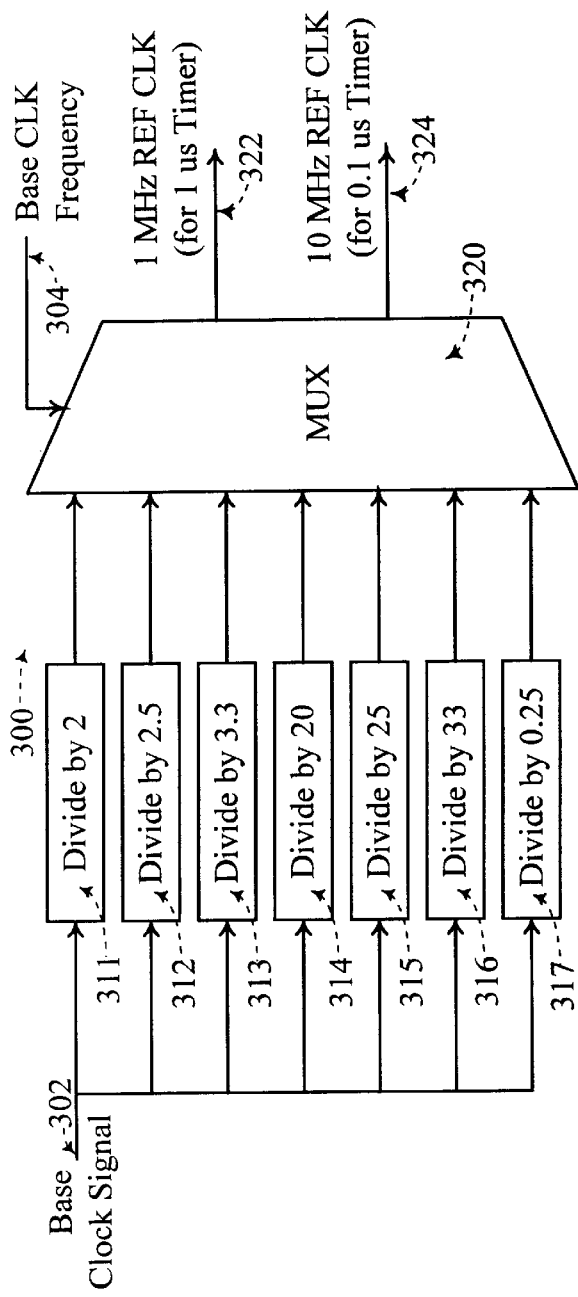
FIG. 3 shows components of the computer peripheral device of FIGS. 1 and 2 for generating reference clock signals from a base clock signal, according to a preferred embodiment of the present invention.

Referring to FIG. 3, a clock signal generator 300 of the present invention generates a reference clock signal locally within the computer peripheral device 112 given a base clock signal from the base signal source 202 that is external to the computer peripheral device 112. The clock signal generator 300 includes a first input 302 coupled to the base signal source 202 for accepting the base clock signal from the base signal source 202. For the example of the Ethernet computer network peripheral device, two reference clock signals may be required for timing events. A first reference clock signal may be needed to have a first reference frequency of 1 MHZ for a 1 $\mu$s (microsecond) timer and a second reference clock signal may be needed to have a second reference frequency of 10 MHZ for a 0.1 $\mu$s (microsecond) timer.

Typical base frequencies of the base clock signal from the base signal source 202 are 2.5 MHZ, 20 MHZ, 25 MHZ, or 33 MHZ. The base frequency of the base clock signal may vary depending on the base signal source 202. For example, for the Ethernet computer network peripheral device 112 of FIG. 1, the base signal source 202 of FIG. 2A from the host system of the first computer 102 may vary depending on the type of the host system of the first computer 102. Furthermore, the type of computer within which the computer peripheral device 112 is installed may vary with time as computer technology advances with time.

In the case the base signal source is from the rest of the computer network 206 as in FIG. 2B, the base frequency may vary depending on which component within the computer network includes the base signal source 202. Furthermore, this base frequency of the base clock signal may vary with time as computer network technology also advances with time.

To account for variability of the base frequency of the base clock signal, the clock signal generator 300 includes a second input 304 coupled to the storage device 204 for accepting information regarding the base clock signal from the storage device 204. In particular, the second input 304 accepts the value of the base frequency of the base clock signal from the storage device 204.

Then, to generate a reference clock signal having a stable reference frequency, the clock signal generator 300 includes a plurality of frequency dividers including a first frequency divider 311, a second frequency divider 312, a third frequency divider 313, a fourth frequency divider 314, a fifth frequency divider 315, a sixth frequency divider 316, and a seventh frequency divider 317 in FIG. 3. Each frequency divider outputs a respective divided clock signal having a respective frequency which is the base frequency divided by a respective factor.

Thus, the first frequency divider 311 generates a first divided clock signal having a respective frequency which is the base frequency divided by 2. The second frequency divider 312 generates a second divided clock signal having a respective frequency which is the base frequency divided by 2.5. The third frequency divider 313 generates a third divided clock signal having a respective frequency which is the base frequency divided by 3.3. The fourth frequency divider 314 generates a fourth divided clock signal having a respective frequency which is the base frequency divided by 20. The fifth frequency divider 315 generates a fifth divided clock signal having a respective frequency which is the base frequency divided by 25. The sixth frequency divider 316 generates a sixth divided clock signal having a respective frequency which is the base frequency divided by 33. The seventh frequency divider 317 generates a seventh divided clock signal having a respective frequency which is the base frequency divided by 0.25.

A multiplexer 320 is coupled to the outputs of the plurality of frequency dividers 311, 312, 313, 314, 315, 316, and 317 and to the second input 304. From the value of the base frequency of the base clock signal at the second input 304, the multiplexer 320 selects as the reference clock signal a divided clock signal having a respective frequency that is closest to the reference frequency from the plurality of divided clock signals.

For example, the computer peripheral device 112 may be an Ethernet computer network peripheral device which requires a first reference clock signal having a first reference frequency of 1 MHZ for a 1 $\mu$s (microsecond) timer and a second reference clock signal having a second reference frequency of 10 MHZ for a 0.1 $\mu$s (microsecond) timer. Furthermore, assume for example that the base clock signal has a base frequency of 33 MHZ.

In that case, the second input 304 indicates to the multiplexer 320 that the value of the base frequency is 33 MHZ. The multiplexer then selects the divided clock signal from the sixth frequency divider 316 for the first reference clock signal of 1 MHZ at a first output 322 and selects the divided clock signal from the third frequency divider 313 for the second reference clock signal of 10 MHZ at a second output 324.

The multiplexer 320 keeps track of the respective frequency division factor of each of the plurality of frequency dividers 311, 312, 313, 314, 315, 316, and 317. Then, from the value of the base frequency at the second input 304, the multiplexer 320 selects as a reference clock signal the appropriate divided clock signal from the plurality of frequency dividers. The multiplexer 320 may include a data processor, as is typically used in an Ethernet computer network peripheral device, for determining a ratio of the base clock frequency over the reference clock frequency. The multiplexer 320 then selects the output of the frequency divider having a respective frequency division factor that is closest to the ratio of the base clock frequency over the reference clock frequency.

Figure 4:
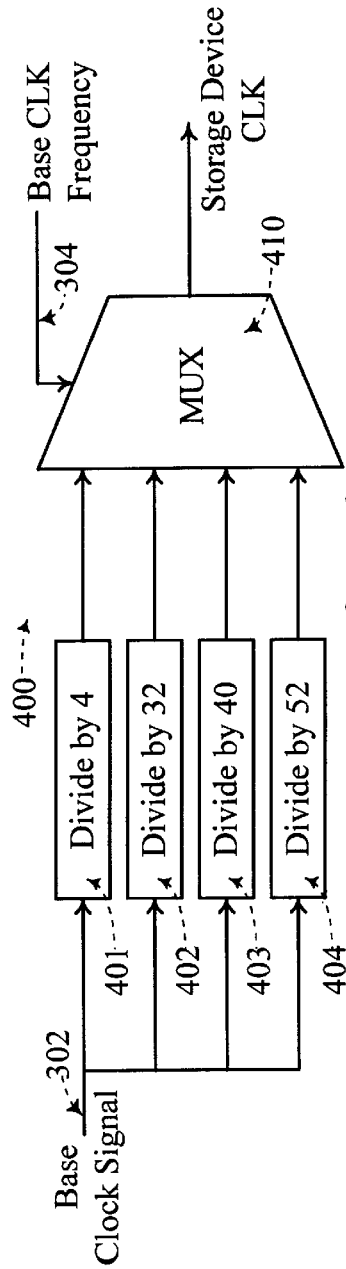
FIG. 4 shows additional components of the computer peripheral device of FIG. 3 for generating a storage device clock signal from the base clock signal, according to another preferred embodiment of the present invention.

Referring to FIG. 4, in another embodiment of the present invention, the clock signal generator of the present invention may further include a storage device clock generator 400 for generating a storage device clock signal having a storage device frequency from the base clock signal. The storage device clock signal drives the storage device 204 of FIG. 2 when the value of the base frequency is read from the storage device 204.

The storage device clock signal generator 400 is coupled to the first input 302 for receiving the base clock signal from the base signal source 202 and to the second input 304 for receiving the value of the base frequency of the base clock signal. The base clock signal is coupled through a second plurality of frequency dividers including a first frequency divider 401, a second frequency divider 402, a third frequency divider 403, and a fourth frequency divider 404 in FIG. 4. Similar to the clock signal generator 300 of FIG. 3, each of the second plurality of frequency dividers of FIG. 4 outputs a respective divided clock signal having a respective frequency which is the base frequency of the base clock signal divided by a respective factor.

Thus, the first frequency divider 401 generates a first divided clock signal having a respective frequency which is the base frequency divided by 4. The second frequency divider 402 generates a second divided clock signal having a respective frequency which is the base frequency divided by 32. The third frequency divider 403 generates a third divided clock signal having a respective frequency which is the base frequency divided by 40. The fourth frequency divider 404 generates a fourth divided clock signal having a respective frequency which is the base frequency divided by 52.

A second multiplexer 410 is coupled to the outputs of the second plurality of frequency dividers 401, 402, 403, and 404 and to the second input 304. From the value of the base frequency of the base clock signal at the second input 304, the second multiplexer 410 selects as the storage device clock signal a divided clock signal having a respective frequency that is closest to the storage device frequency from the plurality of divided clock signals from the second plurality of frequency dividers.

When the computer peripheral device 112 initializes, the appropriate value of the base frequency of the base clock signal is unknown since the appropriate storage device clock signal is not yet generated. Typically, storage devices such as EEPROMs are slow devices running at low clock frequencies. Thus, at initialization, the second multiplexer 410 selects the divided clock signal having a respective frequency that is lowest of the plurality of divided clock signals of the second plurality of frequency dividers 401, 402, 403, and 404. In FIG. 4, the output of the fourth frequency divider 404 which has a divided clock frequency with a respective frequency that is the base frequency divided by 52 is selected by the second multiplexer 410 during initialization of the computer peripheral device 112.

Then, once the value of the base frequency of the base clock signal is read from the storage device 202, the second multiplexer 410 selects as the storage device clock signal a divided clock signal have a respective frequency that is closest to the storage device frequency from the outputs of the second plurality of frequency dividers 401, 402, 403, and 404. This storage device clock signal is coupled to the storage device 202 and drives the storage device 202 for continuously reading the value of the base frequency of the base clock signal from the storage device 202.

In this manner, a reference clock signal having a reference frequency is generated locally within the computer peripheral device 112 given a base clock signal having a base frequency from a base signal source which is external to the computer peripheral device 112. This base signal source may vary and thus the base frequency of the base clock signal may vary. The present invention uses a plurality of frequency dividers and a multiplexer to generate a reference clock signal having a stable reference frequency despite possible variations in the base frequency of the base clock signal.

The foregoing is by way of example only and is not intended to be limiting. For example, the present invention may be implemented with any number of frequency dividers having any frequency division factor, and the present invention may generate any number of reference clock signals. More importantly, the reference clock frequency may be generated for any electronic device (aside from just the example of the Ethernet computer network peripheral device 112) from a base clock signal provided by a base signal source disposed on any unit (aside from just the example of the computer host system 102 or the network of computers 206) external to the electronic device, and the value of the base frequency of the base clock signal may be read from any kind of storage device disposed on any unit external to the electronic device. The invention is limited only as defined in the following claims and equivalents thereof.

We claim:

1. A clock signal generator that generates a reference clock signal having a reference frequency for an electronic device from a base clock signal having a base frequency, the clock signal generator comprising:

a first input, coupled to one of a variety of a base signal source that is external to the electronic device, for accepting the base clock signal from the base signal source, wherein said base frequency of said base clock signal is variable depending on said one of said variety of said base signal source to which said first input is coupled;

a second input, coupled to a storage device that is external to the electronic device, for accepting the value of the base frequency from the storage device, said storage device corresponding to said one of said variety of said base signal source to which said first input is coupled;

a plurality of frequency dividers, each frequency divider coupled to the first input for dividing the base frequency of the base clock signal by a respective factor to generate a respective divided clock signal having a respective frequency; and a multiplexer, coupled to the second input and to the plurality of frequency dividers, to select as the reference clock signal a divided clock signal having a respective frequency that is closest to the reference frequency from the plurality of divided clock signals.

2. The clock signal generator of claim 1, wherein a first reference clock signal having a first reference frequency and a second reference clock signal having a second reference frequency are generated by the multiplexer selecting as the first reference clock signal a first divided clock signal having a first respective frequency that is closest to the first reference frequency, and by the multiplexer selecting as the second reference clock signal a second divided clock signal having a second respective frequency that is closest to the second reference frequency.

3. The clock signal generator of claim 1, further comprising:
- a storage device clock signal generator, coupled to the first input, the second input, and the storage device, for generating a storage device clock signal having a storage device frequency from the base clock signal for reading the value of the base frequency from the storage device.

4. The clock signal generator of claim 3, wherein the storage device clock signal generator further includes:
- a second plurality of frequency dividers, each of the second plurality of frequency dividers coupled to the first input for dividing the base frequency of the base clock signal by a respective factor to generate a respective divided clock signal having a respective frequency; and
- a second multiplexer, coupled to the second input and to the second plurality of frequency dividers, to select as the storage device clock signal a divided clock signal having a respective frequency that is closest to the storage device frequency from the divided clock signals of the second plurality of frequency dividers.

5. The clock signal generator of claim 4, wherein the second multiplexer selects as the storage device clock signal a divided clock signal having a respective frequency that is lowest of the respective frequencies of the divided clock signals of the second plurality of frequency dividers when the electronic device is initializing.

6. The clock signal generator of claim 1, wherein the electronic device is an Ethernet computer network peripheral device coupled between a computer host system and a computer network, and wherein the base signal source is from the computer host system, and wherein the storage device containing the value of the base frequency is an EEPROM within the computer host system.

7. The clock signal generator of claim 1, wherein the electronic device is an Ethernet computer network peripheral device coupled between a computer host system and a computer network, and wherein the base signal source is from the computer network, and wherein the storage device containing the value of the base frequency is an EEPROM within the computer network.

8. A clock signal generator that generates a reference clock signal having a reference frequency for an electronic device from a base clock signal having a base frequency, the clock signal generator comprising:
- a first input, coupled to a base signal source that is external to the electronic device, for accepting the base clock signal from the base signal source;
- a second input, coupled to a storage device that is external to the electronic device, for accepting the value of the base frequency from the storage device;
- a plurality of frequency dividers, each frequency divider coupled to the first input for dividing the base frequency of the base clock signal by a respective factor to generate a respective divided clock signal having a respective frequency; and
- a multiplexer, coupled to the second input and to the plurality of frequency dividers, to select as the reference clock signal a divided clock signal having a respective frequency that is closest to the reference frequency from the plurality of divided clock signals;

wherein the electronic device is an Ethernet computer network peripheral device coupled between a computer host system and a computer network, and wherein the base signal source is from the computer host system, and wherein the storage device containing the value of the base frequency is an EEPROM within the computer host system.

9. A clock signal generator that generates a reference clock signal having a reference frequency for an electronic device from a base clock signal having a base frequency, the clock signal generator comprising:
- a first input, coupled to a base signal source that is external to the electronic device, for accepting the base clock signal from the base signal source;
- a second input, coupled to a storage device that is external to the electronic device, for accepting the value of the base frequency from the storage device;
- a plurality of frequency dividers, each frequency divider coupled to the first input for dividing the base frequency of the base clock signal by a respective factor to generate a respective divided clock signal having a respective frequency; and
- a multiplexer, coupled to the second input and to the plurality of frequency dividers, to select as the reference clock signal a divided clock signal having a respective frequency that is closest to the reference frequency from the plurality of divided clock signals;

wherein the electronic device is an Ethernet computer network peripheral device coupled between a computer host system and a computer network, and wherein the base signal source is from the computer network, and wherein the storage device containing the value of the base frequency is an EEPROM within the computer network.

10. A clock signal generator that generates a reference clock signal having a reference frequency for an electronic device from a base clock signal having a base frequency, the clock signal generator comprising:
- a first input, coupled to a base signal source that is external to the electronic device, for accepting the base clock signal from the base signal source;
- a second input, coupled to a storage device that is external to the electronic device, for accepting the value of the base frequency from the storage device;
- a plurality of frequency dividers, each frequency divider coupled to the first input for dividing the base frequency of the base clock signal by a respective factor to generate a respective divided clock signal having a respective frequency;
- a multiplexer, coupled to the second input and to the plurality of frequency dividers, to select as the reference clock signal a divided clock signal having a respective frequency that is closest to the reference frequency from the plurality of divided clock signal; and
- a storage device clock signal generator, coupled to the first input, the second input, and the storage device, for generating a storage device clock signal having a storage device frequency from the base clock signal for reading the value of the base frequency from the storage device;

wherein the storage device clock signal generator further includes:

a second plurality of frequency dividers, each of the second plurality of frequency dividers coupled to the first input for dividing the base frequency of the base clock signal by a respective factor to generate a respective divided clock signal having a respective frequency; and a second multiplexer, coupled to the second input and to the second plurality of frequency dividers, to select as the storage device clock signal a divided clock signal having a respective frequency that is closest to the storage device frequency from the divided clock signals of the second plurality of frequency dividers.

11. The clock signal generator of claim 10, wherein the second multiplexer selects as the storage device clock signal a divided clock signal having a respective frequency that is lowest of the respective frequencies of the divided clock signals of the second plurality of frequency dividers when the electronic device is initializing.

12. A clock signal generator that generates a first reference clock signal having a first reference frequency and a second reference clock signal having a second reference frequency for an Ethernet computer network peripheral device, coupled between a computer host system and a computer network, from a base clock signal having a base frequency, the frequency generator comprising:

a first input, coupled to a base signal source that is part of the computer host system, for accepting the base clock signal from the base signal source;

a second input, coupled to an EEPROM that is part of the computer host system, for accepting the value of the base frequency from the EEPROM;

a plurality of frequency dividers, each frequency divider coupled to the first input for dividing the base frequency of the base clock signal by a respective factor to generate a respective divided clock signal having a respective frequency;

a multiplexer, coupled to the second input and to the plurality of frequency dividers, to select as the first reference clock signal a first divided clock signal having a first respective frequency that is closest to the first reference frequency, and to select as the second reference clock signal a second respective divided clock signal having a second respective frequency that is closest to the second reference frequency; and an EEPROM clock signal generator, coupled to the first input, the second input, and the EEPROM, for generating an EEPROM clock signal having an EEPROM frequency from the base clock signal for reading the value of the base frequency from the EEPROM, the EEPROM clock signal generator further including:

a second plurality of frequency dividers, each of the second plurality of frequency dividers being coupled to the first input for dividing the base frequency of the base clock signal by a respective factor to generate a respective divided clock signal having a respective frequency; and a second multiplexer, coupled to the second input and to the second plurality of frequency dividers, to select as the EEPROM clock signal a divided clock signal having a respective frequency that is closest to the EEPROM frequency from the divided clock signals of the second plurality of frequency dividers.

13. A clock signal generator that generates a reference clock signal having a reference frequency for an electronic device from a base clock signal having a base frequency, the clock signal generator comprising:

a first input, coupled to one of a variety of a base signal source that is external to the electronic device, for accepting the base clock signal from the base signal source, wherein said base frequency of said base clock signal is variable depending on said one of said variety of said base signal source to which said first input is coupled;

a second input, coupled to a storage device that is external to the electronic device, for accepting the value of the base frequency from the storage device, said storage device corresponding to said one of said variety of said base signal source to which said first input is coupled;

means for generating a plurality of divided clock signals by frequency dividing the base clock signal, each divided clock signal having a respective frequency; and means for selecting as the reference clock signal a divided clock signal having a respective frequency that is closest to the reference frequency, from the plurality of divided clock signals.

14. The clock signal generator of claim 13, further comprising:

means for generating a storage device clock signal from the base clock signal for reading the value of the base frequency from the storage device.

15. A method for generating a reference clock signal having a reference frequency for an electronic device from a base clock signal having a base frequency, the method including the steps of:

accepting the base clock signal from one of a variety of a base signal source that is external to the electronic device, wherein said base frequency of said base clock signal is variable depending on said one of said variety of said base signal source from which said base clock signal is accepted;

accepting the value of the base frequency from a storage device that is external to the electronic device, said storage device corresponding to said one of said variety of said base signal source from which said base clock signal is accepted;

dividing the base frequency of the base clock signal by a plurality of factors to generate a plurality of divided clock signals, each divided clock signal having a respective frequency; and selecting as the reference clock signal a divided clock signal having a respective frequency that is closest to the reference frequency, from the plurality of divided clock signals.

16. The method of claim 15, wherein the step of selecting the reference clock signal further includes the steps of:

selecting as a first reference clock signal having a first reference frequency a first divided clock signal having a first respective frequency that is closest to the first reference frequency from the plurality of divided clock signals; and selecting as a second reference clock signal having a second reference frequency a second divided clock signal having a second respective frequency that is closest to the second reference frequency from the plurality of divided clock signals.

17. The method of claim 15, further comprising the step of:

generating a storage device clock signal having a storage device frequency from the base clock signal for reading the value of the base frequency from the storage device.

18. The method of claim 17, wherein the step of generating the storage device clock signal further includes the steps of:

dividing the base frequency of the base clock signal by a plurality of factors to generate a second plurality of divided clock signals, each divided clock signal having a respective frequency; and selecting as the storage device clock signal a divided clock signal having a respective frequency that is closest to the storage device frequency from the second plurality of divided clock signals.

19. The method of claim 18, wherein the step of generating the storage device clock signal further includes the step of:

selecting as the storage device clock signal a divided clock signal having a respective frequency that is lowest of the second plurality of divided clock signals when the electronic device is initializing.

20. The method of claim 15, wherein the electronic device is an Ethernet computer network peripheral device coupled between a computer host system and a computer network, and wherein the base signal source is from the computer host system, and wherein the storage device containing the value of the base frequency is an EEPROM within the computer host system.

21. The method of claim 15, wherein the electronic device is an Ethernet computer network peripheral device coupled between a computer host system and a computer network, and wherein the base signal source is from the computer network, and wherein the storage device containing the value of the base frequency is an EEPROM within the computer network.

22. A method for generating a reference clock signal having a reference frequency for an electronic device from a base clock signal having a base frequency, the method including the steps of:

accepting the base clock signal from a base signal source that is external to the electronic device;

accepting the value of the base frequency from a storage device that is external to the electronic device;

dividing the base frequency of the base clock signal by a plurality of factors to generate a plurality of divided clock signals, each divided clock signal having a respective frequency; and selecting as the reference clock signal a divided clock signal having a respective frequency that is closest to the reference frequency, from the plurality of divided clock signals;

wherein the electronic device is an Ethernet computer network peripheral device coupled between a computer host system and a computer network, and wherein the base signal source is from the computer host system, and wherein the storage device containing the value of the base frequency is an EEPROM within the computer host system.

23. A method for generating a reference clock signal having a reference frequency for an electronic device from a base clock signal having a base frequency, the method including the steps of:

accepting the base clock signal from a base signal source that is external to the electronic device;

accepting the value of the base frequency from a storage device that is external to the electronic device;

dividing the base frequency of the base clock signal by a plurality of factors to generate a plurality of divided clock signals, each divided clock signal having a respective frequency; and selecting as the reference clock signal a divided clock signal having a respective frequency that is closest to the reference frequency, from the plurality of divided clock signals;

wherein the electronic device is an Ethernet computer network peripheral device coupled between a computer host system and a computer network, and wherein the base signal source is from the computer network, and wherein the storage device containing the value of the base frequency is an EEPROM within the computer network.

24. A method for generating a reference clock signal having a reference frequency for an electronic device from a base clock signal having a base frequency, the method including the steps of:

accepting the base clock signal from a base signal source that is external to the electronic device;

accepting the value of the base frequency from a storage device that is external to the electronic device;

dividing the base frequency of the base clock signal by a plurality of factors to generate a plurality of divided clock signals, each divided clock signal having a respective frequency;

selecting as the reference clock signal a divided clock signal having a respective frequency that is closest to the reference frequency, from the plurality of divided clock signals; and generating a storage device clock signal having a storage device frequency from the base clock signal for reading the value of the base frequency from the storage device;

wherein the step of generating the storage device clock signal further includes the steps of:

dividing the base frequency of the base clock signal by a plurality of factors to generate a second plurality of divided clock signals, each divided clock signal having a respective frequency; and selecting as the storage device clock signal a divided clock signal having a respective frequency that is closest to the storage device frequency from the second plurality of divided clock signals.

25. The method of claim 24, wherein the step of generating the storage device clock signal further includes the step of:

selecting as the storage device clock signal a divided clock signal having a respective frequency that is lowest of the second plurality of divided clock signals when the electronic device is initializing.

* * * * *